(12) United States Patent
Gupta et al.

(10) Patent No.: US 11,868,508 B2
(45) Date of Patent: *Jan. 9, 2024

(54) COMPUTER SYSTEM AND DEVICE FOR CONTROLLING USE OF SECURE MEDIA RECORDINGS

(71) Applicant: Uber Technologies, Inc., San Francisco, CA (US)

(72) Inventors: Shobhit Gupta, San Francisco, CA (US); Mikhail Bosin, San Francisco, CA (US); Neil Chopra, San Francisco, CA (US); Garrick Buckley, San Francisco, CA (US); Emmanuelle Soni, San Francisco, CA (US); Dhaval Shah, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/967,669

(22) Filed: Oct. 17, 2022

(65) Prior Publication Data

US 2023/0044642 A1 Feb. 9, 2023

Related U.S. Application Data

(63) Continuation of application No. 17/170,510, filed on Feb. 8, 2021, now Pat. No. 11,494,517.

(Continued)

(51) Int. Cl.
*G06F 21/62* (2013.01)

(52) U.S. Cl.
CPC .............................. *G06F 21/6272* (2013.01)

(58) Field of Classification Search
CPC ............... G06Q 10/0833; B60W 40/09; H04L 2209/84; H04L 63/0428; H04L 63/0442;
(Continued)

(56) References Cited

U.S. PATENT DOCUMENTS

| 4,750,197 A | 6/1988 | Denekamp |
| 6,195,648 B1 | 2/2001 | Simon |

(Continued)

FOREIGN PATENT DOCUMENTS

| EP | 1156462 | 11/2005 |
| EP | 2767962 | 8/2014 |

(Continued)

OTHER PUBLICATIONS

International Search Report and Written Opinion in PCT/US2016/026799 dated Jul. 28, 2016.

(Continued)

*Primary Examiner* — Brian F Shaw
(74) *Attorney, Agent, or Firm* — Mahamedi IP Law LLP

(57) ABSTRACT

A network system enables a user to record media in connection with a user operating a service application to participate in a transport service. In examples, the network system includes a user computing device on which media is recorded and stored in an unrenderable state. The user can elect to make a media recording submission for a particular service activity (e.g., trip provided or received by user). In response to the media recording submission, the user computing device identifies one or more media files that contain media data which depict the service activity. The identified media foes are transmitted to a service computing system where the media files can be rendered.

20 Claims, 4 Drawing Sheets

Related U.S. Application Data

(60) Provisional application No. 62/975,203, filed on Feb. 12, 2020.

(58) Field of Classification Search
CPC ...... H04L 9/0825; H04L 67/22; H04W 12/02; G07C 5/008; G07C 5/08; G06F 21/6272
See application file for complete search history.

(56) References Cited

U.S. PATENT DOCUMENTS

| | | |
|---|---|---|
| 6,263,435 B1 | 7/2001 | Dondeti |
| 8,010,285 B1 | 8/2011 | Denise |
| 8,417,448 B1 | 4/2013 | Denise |
| 8,417,449 B1 | 4/2013 | Denise |
| 8,538,158 B1 | 9/2013 | Denise |
| 8,554,468 B1 | 11/2013 | Bullock |
| 8,670,930 B1 | 3/2014 | Denise |
| 8,718,926 B1 | 5/2014 | Denise |
| 8,762,048 B2 | 6/2014 | Kosseifi |
| 8,915,738 B2 | 12/2014 | Mannino |
| 8,924,240 B2 | 12/2014 | Depura et al. |
| 8,934,719 B1 | 1/2015 | Denise |
| 9,049,105 B1 | 6/2015 | Feinstein |
| 9,097,545 B1 | 8/2015 | Denise |
| 9,881,268 B1 | 1/2018 | Briggs |
| 9,898,759 B2 | 2/2018 | Khoury |
| 10,129,221 B1 * | 11/2018 | McClendon .......... H04L 9/0825 |
| 2001/0049275 A1 | 12/2001 | Pierry |
| 2005/0131597 A1 | 6/2005 | Raz |
| 2008/0030376 A1 | 2/2008 | Tunnell |
| 2008/0252412 A1 | 10/2008 | Larrson |
| 2008/0255722 A1 | 10/2008 | McClellan |
| 2009/0088924 A1 | 4/2009 | Coffee |
| 2009/0192851 A1 | 7/2009 | Bishop |
| 2009/0234552 A1 | 9/2009 | Takeda |
| 2010/0020170 A1 | 1/2010 | Higgins-Luthman |
| 2010/0136994 A1 | 6/2010 | Taylor |
| 2010/0222645 A1 | 9/2010 | Nadler |
| 2011/0000747 A1 | 1/2011 | Wu |
| 2011/0125521 A1 | 5/2011 | Dhoble |
| 2011/0301806 A1 | 12/2011 | Messier |
| 2011/0301985 A1 | 12/2011 | Camp |
| 2012/0095844 A1 | 4/2012 | Barnes, Jr. |
| 2012/0174111 A1 | 7/2012 | Pala |
| 2012/0191343 A1 | 7/2012 | Haleem |
| 2012/0232741 A1 | 9/2012 | Sekiyama |
| 2012/0232943 A1 | 9/2012 | Myr |
| 2012/0283893 A1 | 11/2012 | Lee |
| 2013/0005414 A1 | 1/2013 | Bindra et al. |
| 2013/0066688 A1 | 3/2013 | Pinkus |
| 2013/0222133 A1 | 8/2013 | Schultz |
| 2013/0226622 A1 | 8/2013 | Adamson |
| 2013/0226926 A1 | 8/2013 | Beaurepaire |
| 2013/0311081 A1 | 11/2013 | Yamakawa |
| 2013/0345961 A1 | 12/2013 | Leader |
| 2014/0051465 A1 | 2/2014 | Ruys et al. |
| 2014/0067434 A1 | 3/2014 | Bourne et al. |
| 2014/0129951 A1 | 5/2014 | Amin et al. |
| 2014/0207342 A1 | 7/2014 | Chen et al. |
| 2014/0358376 A1 | 12/2014 | Phelan |
| 2015/0087258 A1 | 3/2015 | Barnes |
| 2015/0095235 A1 | 4/2015 | Dua |
| 2015/0100505 A1 | 4/2015 | Binion |
| 2015/0106900 A1 | 4/2015 | Pinski |
| 2015/0113622 A1 | 4/2015 | Dua |
| 2015/0223024 A1 | 8/2015 | Abuodeh |
| 2015/0254581 A1 | 9/2015 | Brahme |
| 2015/0266455 A1 | 9/2015 | Wilson |
| 2015/0279213 A1 | 10/2015 | Balter |
| 2015/0293234 A1 | 10/2015 | Snyder |
| 2015/0302342 A1 | 10/2015 | Yeh |
| 2015/0304784 A1 | 10/2015 | Snider |
| 2015/0307107 A1 | 10/2015 | Tamari |
| 2015/0324379 A1 | 11/2015 | Danovitz |
| 2015/0348221 A1 | 12/2015 | Pedersen |
| 2015/0358677 A1 | 12/2015 | Papa |
| 2016/0161275 A1 | 6/2016 | Waltermann |
| 2016/0189310 A1 | 6/2016 | O'Kane |
| 2016/0192166 A1 | 6/2016 | decharms |
| 2016/0196737 A1 | 7/2016 | Martin |
| 2016/0232719 A1 | 8/2016 | Brinig |
| 2016/0337294 A1 | 11/2016 | Garg |
| 2016/0358388 A1 | 12/2016 | Skoglund |
| 2016/0373473 A1 | 12/2016 | Truong |
| 2017/0039890 A1 | 2/2017 | Truong |
| 2017/0046407 A1 | 2/2017 | Palmert |
| 2017/0132540 A1 | 5/2017 | Haparnas |
| 2017/0134559 A1 | 5/2017 | Shetty |
| 2017/0161439 A1 | 6/2017 | Raduchel |
| 2017/0200061 A1 | 7/2017 | Julian |
| 2017/0328725 A1 | 11/2017 | Schlesinger |
| 2017/0358146 A1 | 12/2017 | Brinig |
| 2017/0358147 A1 | 12/2017 | Brinig |
| 2017/0371608 A1 | 12/2017 | Wasserman |
| 2017/0372534 A1 | 12/2017 | Steketee |
| 2018/0018718 A1 | 1/2018 | Childress |
| 2018/0047091 A1 | 2/2018 | Ogden |
| 2018/0086347 A1 | 3/2018 | Shaikh |
| 2018/0089605 A1 | 3/2018 | Poornachandran |
| 2018/0091937 A1 | 3/2018 | Allen |
| 2018/0091938 A1 | 3/2018 | Allen |
| 2018/0218549 A1 | 8/2018 | Wahba |
| 2018/0242375 A1 | 8/2018 | O'Herlihy |
| 2019/0028444 A1 | 1/2019 | McClendan |
| 2019/0139450 A1 | 5/2019 | Truong |
| 2019/0265064 A1 | 8/2019 | Koenig |
| 2019/0271556 A1 | 9/2019 | O'Herlihy |
| 2020/0074752 A1 | 3/2020 | Brinig |
| 2020/0209857 A1 | 7/2020 | Djuric |
| 2020/0219330 A1 | 7/2020 | Brinig |
| 2021/0072034 A1 * | 3/2021 | Meroux ................ G06F 21/554 |
| 2021/0248273 A1 | 8/2021 | Gupta |
| 2021/0335056 A1 | 10/2021 | Brinig |
| 2022/0316903 A1 | 10/2022 | O'Herlihy |

FOREIGN PATENT DOCUMENTS

| | | |
|---|---|---|
| EP | 2700063 | 6/2015 |
| JP | 2014-130552 | 6/2014 |
| KR | 10-2014-0124137 | 10/2014 |
| WO | WO2012080741 A1 | 6/2012 |

OTHER PUBLICATIONS

International Search report in PCT/US2016/016858 dated May 19, 2016.
IPRP in PCT/2016/016858 dated Aug. 17, 2017.
International Search Report and Written Opinion in PCT/US2017/037421 dated Aug. 31, 2017.
IPRP in PCT/US2016/026799 dated Oct. 19, 2017.
Written Opinion issued in SG 11201708199T dated May 7, 2018.
IPRP in PCT/US2017/037421 dated Dec. 27, 2018.
Scott Grimmer, I Got Scammed by an Uber Driver and Customer Service Did What? May 20, 2016.
Examination Report No. 1 in AU 2016215092 dated Nov. 26, 2019.
EESR in EP 17813998.6 dated Jan. 22, 2020.
Examination Report No. 1 in AU 2016246064 dated May 4, 2020.
Pre-Examination Report dated Jul. 30, 2020 in BR 112017016820-0.
Office Action in CA 3027508 dated Dec. 9, 2020.
EESR in EP 21156676.5 dated Jul. 1, 2021.

* cited by examiner

COMPUTER SYSTEM AND DEVICE FOR CONTROLLING USE OF SECURE MEDIA RECORDINGS

RELATED APPLICATIONS

This application is a continuation of U.S. patent application Ser. No. 17/170,510 filed Feb. 2, 2021, which claims the benefit of priority to Provisional U.S. Patent Application No. 62/975,203, filed Feb. 12, 2020; the aforementioned priority applications being hereby incorporated by reference in their entireties for all purposes.

TECHNICAL FIELD

Examples pertain to a network computer system and computing device protecting recorded media.

BACKGROUND

Numerous on-demand services exist to offer users a variety of services: transportation, shipping, food delivery, groceries, pet sitting, mobilized task force and others. Typically, on-demand services leverage resources available through mobile devices, such as wireless (e.g., cellular telephony) devices, which offer developers a platform that can access sensors and other resources available through the mobile device. Many on-demand services include dedicated applications (sometimes referred to as "apps") to communicate with a network service through which an on-demand service is offered.

A transport matching service is one type of on-demand service, where one class of users request transport services ("requesters," such as riders), another class of users provide the transport service ("service providers," such as drivers), and the matching service matches service providers and requesters. Generally, requesters and service providers who are matched to one another are strangers. On occasion, disagreements or more serious incidents occur where an investigation is needed. While users can record media on their devices separate from resources of the service, the recording of such media can be illegal, viewed as an invasion of privacy to the other party, or deemed unreliable.

DETAILED DESCRIPTION

Figure 1:
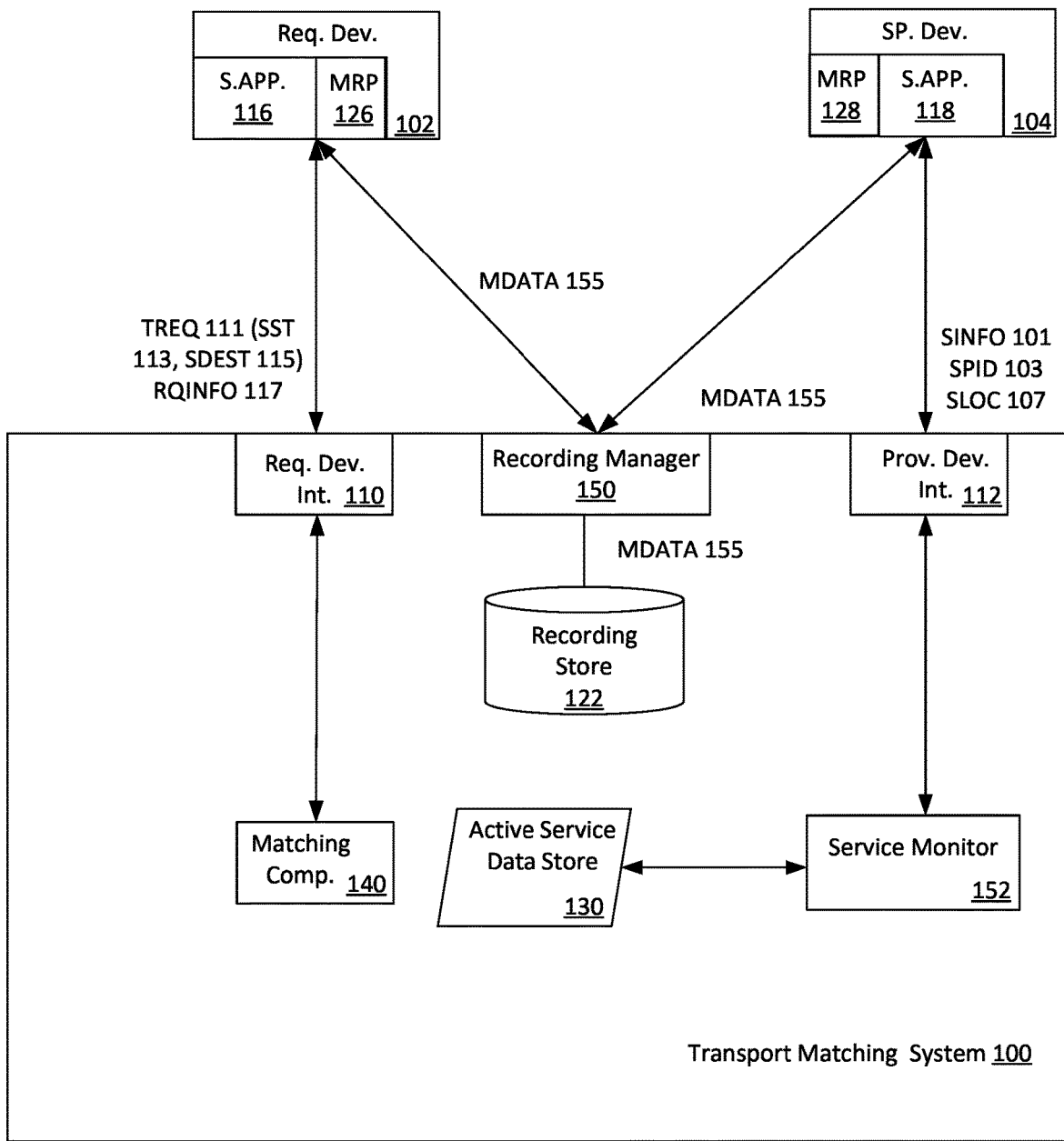
FIG. 1 illustrates an example of a transport matching system that enables the controlled use of secure media recordings, according to one or more examples.

According to examples, a computing device operates to record media in connection with the user operating a service application to participate in a transport service. The computing device structures media data generated from recording media into multiple media files that are unrenderable on the computing device. Further, examples provide for the computing device to process data generated from the service application executing on the user computing device to identify one or more trip activities that occur while the user computing device records media. In some embodiments, the computing device associates each of the one or more trip activities with one or more of the multiple media files that include media data recorded at a time when the trip activity occurred. The computing device stores each of the multiple media files in association with the identified trip activity. Additionally, in some embodiments, the computing device enables the user to generate a media recording submission request that specifies one of the one or more trip activities, to trigger the one or more files being made available to a remote computer that is capable of rendering each of the one or more media files.

Still further, in some examples, a network system is provided that enables a user to record media in connection with a user operating a service application to participate in a transport service. In examples, the network system includes a user computing device on which media is recorded and stored in an unrenderable state. The user can elect to make a media recording submission for a particular service activity (e.g., trip provided or received by user). In response to the media recording submission, the user computing device identifies one or more media files that contain media data which depict the service activity. The identified media files are transmitted to a service computing system where the media files can be rendered.

In examples, the network system enables users who participate in a transport service, either as a service provider or requester, to record media of a transport activity, without sacrificing privacy of other users who may be involved with the same transport activity. For example, a service provider can initiate recording of media on the service provider's device during a time period in which the service provider provides transport to multiple requesters. In the event the service provider encounters a problem with one of the requesters, the service provider can identify the particular service activity (e.g., trip) where the problem occurred. The service provider can then make a media recoding submission, which causes the computing device of the user to transmit media files of the identified service activity to the service computing system. In some examples, the service computing system transforms the transmitted media files into a renderable form, where the media files can be viewed.

As used herein, a client device, a computing device, and/or a mobile computing device refer to devices corresponding to desktop computers, cellular devices or smartphones, laptop computers, tablet devices, etc., that can provide network connectivity and processing resources for communicating with a service arrangement system over one or more networks. In another example, a computing device can correspond to an in-vehicle computing device, such as an on-board computer. Also, as described herein, a user can correspond to a requester of a network service (e.g., a rider) or a service provider (e.g., a driver of a vehicle) that provides location-based services for requesters.

Still further, examples described relate to a variety of location-based (and/or on-demand) services, such as a transport service, a food truck service, a delivery service, an entertainment service, etc., to be arranged between requesters and service providers. In other examples, the system can be implemented by any entity that provides goods or services for purchase through the use of computing devices and network(s). For the purpose of simplicity, in examples described, the service arrangement system can correspond to a transport arrangement system that arranges transport and/ or delivery services to be provided for riders by drivers of vehicles who operate service applications on respective computing devices.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example of a transport matching system that enables the controlled use of secure media recordings, according to one or more examples. In some examples, the transport matching system 100 can be implemented as a network platform in which users operate mobile computing devices of users access or implement functionality to facilitate the user's participation and use of a matching service. In examples, the users of the transport matching system 100 include service providers (e.g., drivers who operate their own vehicles to transport riders) and requesters (e.g., riders who request and receive transport services from drivers). The transport service provided by the service provider may include a service in which the service provider operates a vehicle to transport the requester from a service start location (e.g., pickup location) to a service end location (e.g., destination or drop-off location). In variations, examples described with the transport matching system 100 can be applied to other types of transport services, such as, for example, group transport (e.g., rider has friends or family who accompany the rider on the trip), pooled transport (e.g., driver picks up additional riders who separately request the transport service, typically with different pickup locations and/or drop-off locations), bus transport (e.g., driver transports multiple riders in large-capacity vehicle, sometimes while following a pre-determined route), or delivery transport (e.g., service provider picks up and delivers an item).

With reference to FIG. 1, the transport matching system 100 includes a requester device interface 110, a provider device interface 112, an active service data store 130 and a matching component 140. Additionally, the transport matching system 100 includes a recording manager 150 which operates to manage the implementation of media recording processes 126, 128 on the requester and/or service provider devices 102, 104. Additionally, as described by various examples, the recording manager 150 can control access to the content of media files, such that recorded media files can only be viewed through an interface or process conducted through the recording manager 150. Among other technical benefits and characteristics, examples as described control the access and use of media recordings, originally recorded and stored on the user computing devices 102, 104, such that the respective users of the computing devices are also unable to access the content of the media recordings.

In examples, the provider device interface 112 includes or performs processes that run on the network-side of the transport matching system 100 to establish communication channels with individual devices of service providers. For example, the provider device interface 112 can establish secure sockets with different types of mobile devices, which service providers of the transport matching system 100 can utilize when providing services using their respective vehicles.

In some examples, the service providers operate mobile devices (represented in FIG. 1 by the provider device 104) on which a corresponding service application 118 is executed. Among other functionality, the service application 118 can execute to automate operations which include indicating the availability of the respective service provider to provide service, communicating location information to enable the transport matching system 100 to monitor the location of the service provider's vehicle, receiving information from the transport matching system 100 for facilitating the service provider in receiving and fulfilling matched transport requests, and communicate information to the transport matching system 100 for various purposes, including provisioning determination. Additionally, the service application 118 can execute to generate messages and provide interactive features to enable the service provider to provide input.

The requester device interface 110 includes or performs processes that run on the network-side of the transport matching system 100 to establish communication channels with individual devices of requesters. The requesters may also operate mobile devices (represented in FIG. 1 by the requester device 102) on which a corresponding service application 116 runs. The requesters may operate respective service applications 116 to request transport-related services, such as transport requests 111 between a service start location 113 (or pickup location) and a service-end location 115 (or drop-off/destination). In variations, the types of services which may be arranged through the transport matching system 100 may include human transport, deliveries, shipping, and delivery of on-demand services (e.g., food trucks). As another variation, the types of services which may be arranged through the transport matching system 100 may include pickup and delivery services, such as for pickup and delivery of food from restaurants.

According to some examples, the provider device 104 initiates communications with the transport matching system 100 using the service application 118. The service application 118 may correspond to a program (e.g., a set of instructions or code) that is downloaded and stored on the mobile provider device 104. The service provider can launch the service application 118 in order to access and utilize a matching service provided by transport matching system 100. Through use of the service application 118, the service provider can receive transport requests, and the service provider may operate a service vehicle to fulfill matched transport requests. Once the communication channel is established, the provider device 104 can automatically communicate service information 101 to the transport matching system 100, at repeated intervals or continuously. The service information 101 may include the provider's identifier 103, and the provider's current location 107, which may be determined by the service application 118 interfacing with a satellite receiver (e.g., GPS component or other location-aware resource) of the provider device 104.

The active service data store 130 maintains the most recent service information 101 (e.g., current location 107) for each active service provider at a particular moment. By way of example, each service provider may start a shift by operating the service application 118 (e.g., opening the application on the provider's device 104), and then toggling a state feature provided by the service application 118 to 'on duty'. The service application 118 communicates the activation of the state feature to the transport matching system 100 via the provider device interface 112. The provider device interface 112 processes the service information 101 received from individual service providers. For each service provider, the provider device interface 112 extracts the service provider identifier 103 and the current location 107 of the service provider device 104. As the service provider's location (e.g., with movement of the service provider's vehicle) and availability changes, subsequent communications from the provider device 104 via the provider device interface 112 can be used to update the active service data store 130. In this way, the active service data store 130 may reflect the most current location of each service provider.

In examples, a service monitor component 152 accesses information maintained with the active service data store 130 to monitor activities of service providers and/or requesters. The active service data store 130 may also associate a service state with each service provider. Initially, when the service provider goes on duty, the service state of the service provider is available, meaning the service provider can be matched to a transport request. Once the service provider is matched to a transport request, the associated state of the service provider may change with active data store 130, to reflect, for example, one more unavailable states (e.g., on-trip, enroute to service start, etc.). Likewise, when the service provider fulfills a transport request, the service provider's service state may change once again in active data store 130 to reflect the available state. In this way, the service state and location of each service provider can be tracked or otherwise monitored as the service provider operates a service vehicle in a given geographic region, and for example, as the service provider enters a predefined geographic subregion (or "geofenced subregion"). Thus, the service monitor 152 can communicate an application state to the service provider. Additionally, the service monitor 152 can communicate similar state information to the requester device 102.

In variations, the service state of the service provider can include additional designations where the service provider may be deemed available for matching to new transport requests. As an example, the service state of the service provider can designate a state where the service provider is nearing completion of an existing transport request. In such examples, the service provider may be deemed available in an upcoming time interval, where the service provider will be at the drop-off location of the transport request which the service provider is currently fulfilling. As another example, once a service provider accepts a transport request, the service state of the provider may be changed in active data store 130 from available to a designation that reflects the service provider has been initially matched. The initial match designation may be maintained for a threshold time interval (e.g., ten seconds, one minute), after which the service provider's designation may reflect an unavailable state (e.g., while the service provider is enroute to pickup the requester, or on-trip to transport the transport requester). In such examples, the service provider may be deemed available for matching with other transport requests 111 if the matching is deemed preferable for the service provider, requester and/or in furtherance of a system objective (e.g., reduce wait-time for multiple requesters). These events may be detected and also communicated to the respective devices as application events or state changes.

In some examples, the requester device interface 110 and provider device interface 112 each include or use an application programming interface (API), such as an externally provider-facing API, to communicate data with the requester and provider devices 102, 104, respectively. By providing the externally facing API, the transport matching system 100 can establish secure communication channels via secure access channels over the network through any number of methods, such as web-based forms, programmatic access via RESTful APIs, Simple Object Access Protocol (SOAP), remote procedure call (RPC), scripting access, etc.

The requester device interface 110 can communicate with the requester device 102 to receive or process transport requests 111. When, for example, a requester opens the service application 116 on the requester device 102, the service application 116 may cause the requester device 102 to transmit requester information 117 to the transport matching system 100, where the requester information 117 includes the requester identifier and the current location of the requester. Subsequently, while the service application 116 is operating on the requester device 102, the service application 116 can execute to repeatedly and automatically transmit the current location of the requester to the transport matching system 100. The requester device interface 110 can receive and record the requester information as part of the active service data store 130. For example, the active service data store 130 create or update a requester record to reflect the requester has the service application 116 open, along with the current (or recent) location of the requester.

According to examples, the requester may initiate a transport request 111 from the requester device using the service application 116, where the transport request 111 specifies a set of transport request parameters, such as a service start location 113 (e.g., pickup location of requester or restaurant), and a service end location 115 (e.g., destination of requester's transport, location of requester receiving food delivery). Each transport request 111 may also be associated with requester information 117, such as the requester identifier and the current location of the requester.

In examples, the service monitor 152 can also monitor activities of the requesters via data that is maintained with the active service data store 130. For example, when the requester initially opens the service application 116, the service monitor 152 may associate the requester with a designation of being a source for a potential transport request, as well as a current location of the requester. When the requester initiates a transport request, the service monitor 152 can update the requester record to reflect an open and unassigned transport request. Similarly, when the requester is matched to a service provider, the requester record can be linked to the service provider, to reflect the requester as awaiting or receiving transport. In this way, the service monitor 152 can communicate application events and state changes to the requester device 102 (as well as to the service provider device 104).

The matching component 140 operates to match transport requests 111 with available service providers. The matching component 140 can operate to identify selection criteria for individual transport requests 111, based on the service parameters of the respective transport requests (e.g., service start location 113, service end location 115). Further, the matching component 140 can access the active data store 130 to identify service providers who satisfy or are otherwise match to individual transport requests, based on, for example, the current location and/or status of the respective service provider.

According to examples, the recording manager 150 can be provided on the transport matching system 100 to receive media recording data 155 from either the requester device 102 or the service provider device 104. The recording manager 150 may store the media recording data 155 in a recording store 122. As described with examples provided below, the media recording data 155 can include, foe example, data sets such as metadata and fingerprints of recorded media files, as well as media files reflecting segments of media recordings. The recording manager 150 can also communicate certain types of data to the respective computing devices 102, 104, such as cryptographic data for enabling media recordings to take place and be secured, as well as data to enable the labeling of media files.

As described by various examples, a user of either of the requester or provider devices 102, 104 can initiate a respective media recording process 126, 128 that results in a secured set of media files being stored on the respective user device. The media files may be stored in an encrypted or protected form, so that the contents of the media files are inaccessible to the user of the computing device. However, if an incident occurs which the user wishes to report, the user can cause the respective computing device to transmit media files associated with a particular trip to the transport matching system 100. The recording manager 150 may then verify the media files as reflecting an original state of the recording, and may also make the media files available in a renderable form for users, in accordance with preestablished rules or processes.

Figure 2:
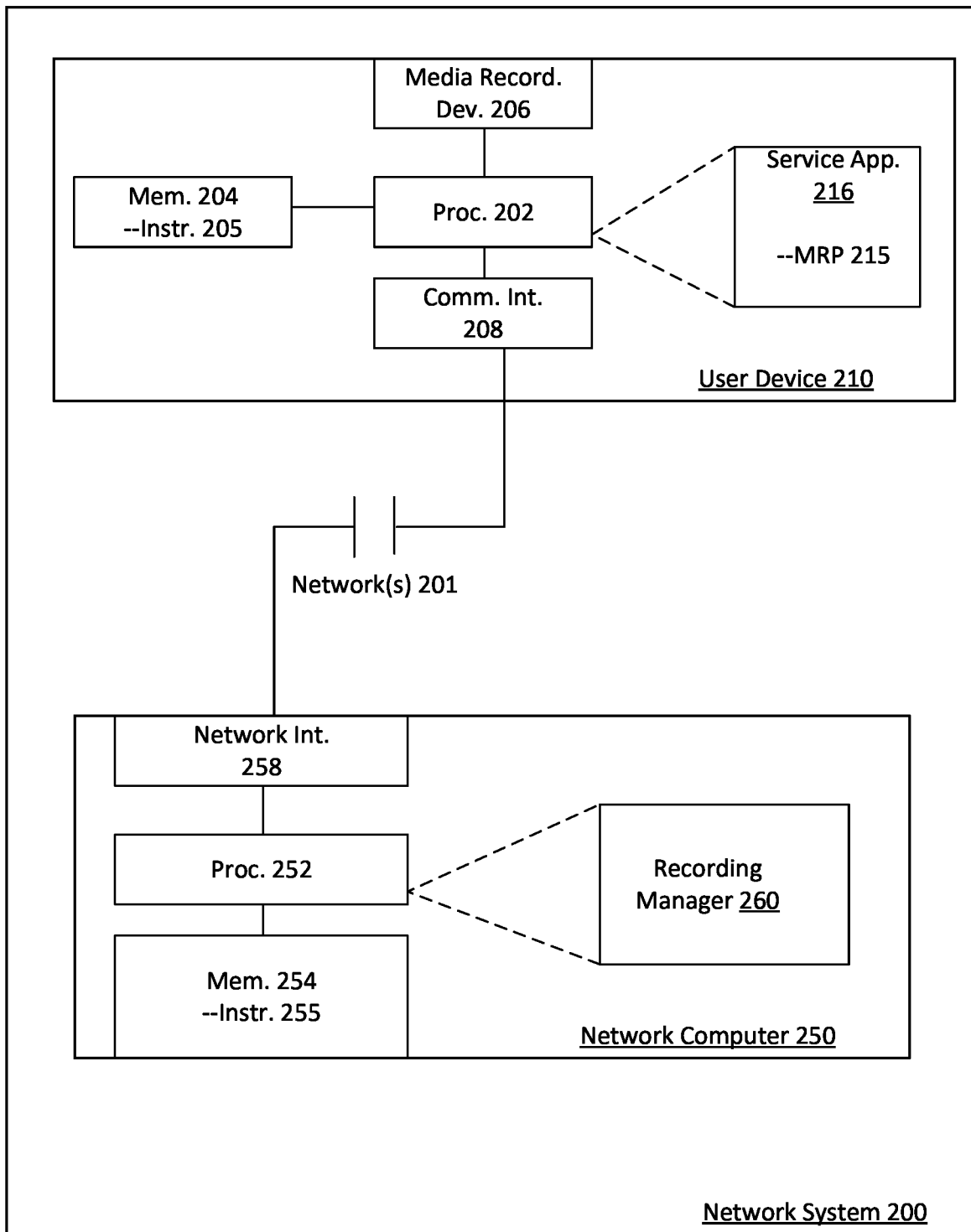
FIG. 2 illustrates a network system to implement a media recording process, in accordance with one or more examples.

FIG. 2 illustrates a network system to implement a media recording process, in accordance with one or more examples. As described with various examples, a network system such as described with an example of FIG. 2 may be implemented in conjunction with a transport matching service such as provided with transport matching system 100 and described with FIG. 1.

With reference to FIG. 2, network computer system 200 includes user mobile user device 210 ("user device 210") and a network computer 250. The user device 210 can include one or more processors 202, a memory 204, a media recording device 206 (e.g., a microphone or camera) and a communication interface 208. The communication interface 208 can correspond to hardware and associated logic (e.g., firmware, software) for enabling the user device 210 to communicate wirelessly, over one or more networks 201, with the network computer 250. The memory 204 stores instructions 205 which can be executed by the processor(s) 202 to cause the network computer system 200 to perform operations for a media recording process 215, as described by various examples. Additionally, the memory 204 stores instructions for a service application 216, which can be executed by the processor(s) 202 to enable the user device 210 to communicate with the network computer 250 through which transport-related services may be arranged.

The network computer 250 can include one or more processors 252, memory 254 to store instructions 255, and network interface 258 to communicate with the user device 210. The network interface 258 can, for example, communicate with the user device 210 using the Internet and/or one or more wireless networks. The processor(s) 252 can execute the instructions 255 to implement a recording manager 260. In some examples, the recording manager 260 communicates with the service application 216 of the user device 210 to exchange recording data, to enable the user device 210 to implement a media recording process 215, to receive copies of media recordings in connection with a submission request of the user, and to enable media files which are unrenderable on the user device 210 to be rendered on the network computer 250.

In examples, the network computer 250 can correspond to a server, combination or servers, or other type of computer system on which the transport matching system 100 is implemented. In variations, the network computer 250 can be implemented separate or remote from the transport matching system 100. The processor(s) 252 of the network computer 250 execute the instructions to perform operations for enabling the user device 210 to implement the media recording process 215, as well as operations for enabling and/or subsequent access to a content of recorded media. In some examples, the processor(s) 252 may also execute operations for performing the media recording process 215.

In examples, the user device 210 and the network computer 250 can implement a platform for a transport matching service, such as implemented by system 100 (see FIG. 1). Thus, for example, the user device 210 can correspond to either requester computing device 102 or service provider device 104, and the service application 216 may correspond to service application 116 executing on the requester device 102, or service application 118 executing on the service provider device 104.

In examples, the network computer 250 enables the user device 210 to securely implement a media recording process 215 within the application environment of the service application 216. The network computer 250 can communicate cryptographic data (e.g., a public cryptographic key, data for enabling generation of a private cryptographic key) for use on the user device 210, in connection with the user device implementing the media recording process 215. The service application 216 may be programmed or controlled through instructions communicated by the network computer 250 to preclude the user from being able to initiate the media recording process 215 or otherwise enable media recordings to take place through the service application 216, absent receipt of the cryptographic data. For example, cryptographic data for enabling the service application 216 to implement the media recording process 215 and securely record media on the user device 210 may be retrieved by the user device 210, or otherwise communicated by the network computer 250 as a response to the service application 216 being launched. As another example, the network computer 250 may periodically communicate cryptographic data to the user device 210, such as, for example, through a background process of the service application 216.

Additionally, in examples, the service application 216 may be configured to generate secure media recordings through implementation of the media recording process 215. The user device 210 may initiate the media recording process 215 through the service application 216, in response to user input. As an addition or variation, the user device 210 may initiate the media recording process 215 through service application 216 as a programmatic or automatic response to a detected event, application state or other application data. In examples, service application 216 can execute on the user device 210 to implement the media recording process 215, with operation of service application 216 being subject to control of the network computer 250. For example, service application 216 may execute to cause the user device 210 to open a communication channel with the network computer 250, from which the user device 210 may receive data (e.g., encryption key) that in turn enables service application 216 to implement the media recording process 215. The user device 210 may be in continuous communication with the network computer 250 so that the media recording process 215 is implemented through a controlled and secure execution environment of service application 216. The service application 216 can initiate the media recording process 215 when the user interacts with the user device 210 to provide a designated input. In some implementations (e.g., user is a service requester or rider), the user may provide an input through the service application 216 (e.g., user input to toggle an input feature), causing the user device 210 to initiate the media recording process 215, in connection with a specific session (e.g., user's transport request which is being fulfilled by a service provider via the transport arrangement service). In other implementations (e.g., user is a service provider or driver), the user may provide an input through the service application 216 to cause the user device 210 to initiate the media recording process 215 for a duration that encompasses multiple sessions—such as, for example, over a duration in which the user fulfills multiple transport requests.

The service application 216 may initiate the media recording process 215 by causing the media recording device 206 to initiate recording of media. The service application 216 can, for example, implement a background process to trigger the media recording device 206 to initiate recording, to sample or otherwise receive media data from the media recording device 206.

In implementing the media recording process 215, the user device 210 can also perform operations that include segmenting media data recorded through the service application 216. The segmentation of the media data can be based on, for example, media data for predetermined durations of time (e.g., one minute) or size (e.g., 100 MB of data). Service application 216 can implement the segmentation so that the recorded media segments reflect a sequence in which the respective media file was recorded. For example, the recorded media segments may incorporate or otherwise be associated with time stamps which reflect a creation date, such that the creation dates reflect a sequence order for each media file.

The service application 216 can, for example, encrypt each segment of media data using a private key, then encrypt the private key using a public key which was previously transmitted to the user device 210.

Service application 216 may at least partially control the media recording process 215 based on a detected application event and/or application state of service application 216. In some examples, a detected application event coincides with a user of the user device 210 using an interface of service application 216 to initiate a media recording. As an addition or variation, an application event may coincide with a user opening service application 216 on the user device 210. Still further, an application event may coincide with service application 216 detecting information about the use of the user device 210 (e.g., a location of the user).

The implementation of the media recording process 215 may further be associated with a state of the service application 216. In examples, the service application 216 may determine its service state, based at least in part on the communications exchanged between the user device 210 and the network computer 250. By way of example, in implementations in which the user device 210 is a requester device, the application state may include (i) a pre-request state coinciding with a time interval between when the user opens the service application 216 and the user generates a transport request; (ii) an awaiting state, where the requester is awaiting the arrival of the service provider at, for example, the pickup location; (iii) an on-trip state, where the requester is in the vehicle of the service provider; and/or (iv) a trip end state; where the requester's trip is at or near completion. Similarly, in implementations in which the user device 210 is a service provider device, the application state may include, for example, (i) an open state, where the service provider awaits an assignment or matching with a transport request; (ii) an enroute state, where the service provider is matched or assigned to a transport request; (iii) an on-trip state, where the service provider is transporting the requester to a destination; and/or (iv) a trip end state; where the requester's trip is at or near completion.

In examples, service application 216 may control when the media recording process 215 is or can be initiated by the user. For example, a user can specify a setting in which the service application 216 automatically initiates the media recording process 215 each time the service application 216 indicates (e.g., via change in application state) that the requester is on-trip.

In some examples, the service application 216 initiates the media recording process 215 as a response to a designated user input. The service application 216 can, for example, generate an input feature which the user can select (e.g., toggle feature) to initiate the media recording process 215. According to some examples, service application 216 generates the input feature to enable the user to select to initiate the media recording process 215 in connection with a particular transport request. As an addition or variation, service application 216 can enable the user to select to implement the media recording process 215 for a particular duration. For example, service application 216 may enable the service provider to select to have the media recording process 215 implemented for a shift (or portion thereof), coinciding with a duration of time during which a service provider provides transport for multiple requesters.

Still further, the ability of the user to initiate the media recording process 215 may be based on a state of the service application 216 and/or one or more detected events. Thus, a user may be precluded from initiating the media recording process 215 unless a particular application state or event is detected. For example, service application 216 can generate an input feature for enabling the user to designate input to initiate the media recording process 215 only when the service state of the application is in a particular state or set of states. To illustrate, for a requester, service application 216 may only provide an input feature to enable the media recording process 215 when the application state is one in which the user has requested service (e.g., service provider is enroute) or one in which the user is on-trip, but not when, for example, the user is a requester and the service application 216 is in a pre-request state.

In implementing the media recording process, service application 216 initiates the media recording process 215 by signaling the media recording device(s) 206 to initiate recording of media, and/or by sampling or otherwise interfacing with the media recording device 206 to obtain recorded media data. As media data is generated by the media recording device 206, service application 216 can implement operations to segment and encrypt the media data into corresponding files, such that the media recording for a particular trip is stored on the user device 210 in multiple encrypted media files. In this way, service application 216 can store media files for recorded segments of media data while the media recording process continues. Moreover, the encrypted media files are structured (e.g., encrypted) so that a content of the media files is inaccessible.

The service application 216 can also implement additional security measures to protect the content of the stored media files on the user device 210. The encrypted media files can, for example, be stored in an application memory of service application 216, such that the media files are not readily accessible to the user. The media files can also be hidden to the user, such that, for example, the media files are not viewable through a file system viewer of the user device 210. Through encryption and/or other security measures, service application 216 precludes the user of the user device 210 from being able to access the media files and their respective content.

According to some examples, service application 216 determines a fingerprint for individual media files as the media files are generated for segments of a media recording. The fingerprint may be determined using metadata associated with the creation of the media file, such that the fingerprint reflects an original state of a newly created media file. By way of example, the fingerprint may be based in part on a file size or creation date of the newly created media file. The service application 216 can transmit a data set to the network computer 250 for each media file, where the transmitted data set includes a fingerprint. In examples, service application 216 transmits the data set to the network computer 250 and receives in turn a cryptographic data set which is based at least in part on the fingerprint, along with a timestamp and a key identifier for the cryptographic data set. The returned data set may be stored in association with the recorded media file on the user device. In some examples, the returned data set enables the recording manager 260 of the network computer 250 to recreate the fingerprint as a basis for comparison with a fingerprint of a copy.

In implementing the media recording process 215, service application 216 labels or otherwise associates each media file that is generated for a segment of recorded media with a particular trip that marks a duration or interval during which the media recording took place. Each trip can, for example, be associated with a corresponding identifier, as well as with identifiers of requesters and service providers. The service application 216 can maintain a trip log on the user device that identifies each trip the user has taken or provided, and the recording manager 260 can use the trip identifier to associate each of a service provider and requester with a trip.

In examples, the user device 210 labels or otherwise associates segments of media recordings so that each media file that corresponds to a segment of a media recording is associated with one or more trips. The association of a trip to a media file recording may be based on application data generated by the execution of the service application 216. For example, the service application 216 can determine a label for a media recording segment based on detected events and/or state of the service application 216. In an implementation in which the user device 210 is for a requester device, the label may be associated with a trip that coincides in time with the recorded media segment. In an implementation in which the user device 210 is for a service provider device, the label may be associated with one or multiple trips that coincides in time with the recorded media segment. For example, the service provider can initiate a recording when the service provider switches to an on-duty state, and subsequently, while the user device 210 is continuously recording, the service provider may complete several trips for requesters in successive order. In such cases, the media recording process 215 can cause the user device 210 to capture media data that records, for example, an end portion of a first trip and a beginning portion of a second trip. As another example, the user device 210 can initiate the media recording process 215 when the service provider is transporting multiple requesters at one time (e.g., 'pool' transport). Thus, one media recording segment may be associated with multiple requesters and/or trips.

In examples, the label of each media recording segment may identify, for example, the date and time when the media recording segment was initiated (e.g., start recording time) and completed (e.g., end recording time), as well as one or more identifiers of the trip or transport request (e.g., identifier of requester and/or service provider). In variations, the media recording segment can be associated with a time stamp reflecting, for example, a media creation date and/or a media transmission date. Still further, the media recording process 215 can generate a label to include metadata which reflects a content of the media file segment.

In some examples, service application 216 can be configured to programmatically end a media recording in response to, for example, an application event. For example, the application state of service application 216 may reflect an event in which the media recording is to be stopped. To illustrate, an initiated media recording process 215 for a requester may automatically terminate once service application 216 detects the trip has ended. The trip end may be detected by, for example, service application 216 communicating with the network computer 250 to receive the application state, through detection of user input reflecting the trip has ended (e.g., service provider ends trip when destination is reached). In variations, the service application 216 may determine that the trip has ended through monitoring of location information on service application 216.

In some variations, the trip end determination may cause service application 216 to generate a timer after which the media recording process 215 is terminated. In some variations, the timer may be displayed to the user, along with a feature that enables the user to provide input to extend the timer. Thus, for example, if the requester initiates the media recording process and the interaction with the service provider extends past the time when the trip has ended, the media recording can continue.

By implementing the media recording process 215 through service application 216, embodiments preclude the user of the user device 210 to access the content of the media recordings. Access to the encrypted media files can only be through transmission of the media files to the network computer 250, such that access to the content of recorded media files is only through the recording manager 260. In variations, the media recording process 215 can also be implemented to automatically delete media files after passage of time (e.g., after a predetermined number of days).

In some examples, the recording manager 260 may include one or more interfaces to enable parties (e.g., third-parties such as law enforcement or operators of the transport matching service) to render the content of the recorded media in limited circumstances. By limiting access to recorded media files, the recording manager 260 prevents unwanted use of such media recordings, such as may result from one user being able to access and distribute media files of such recordings.

Methodology

Figure 3:
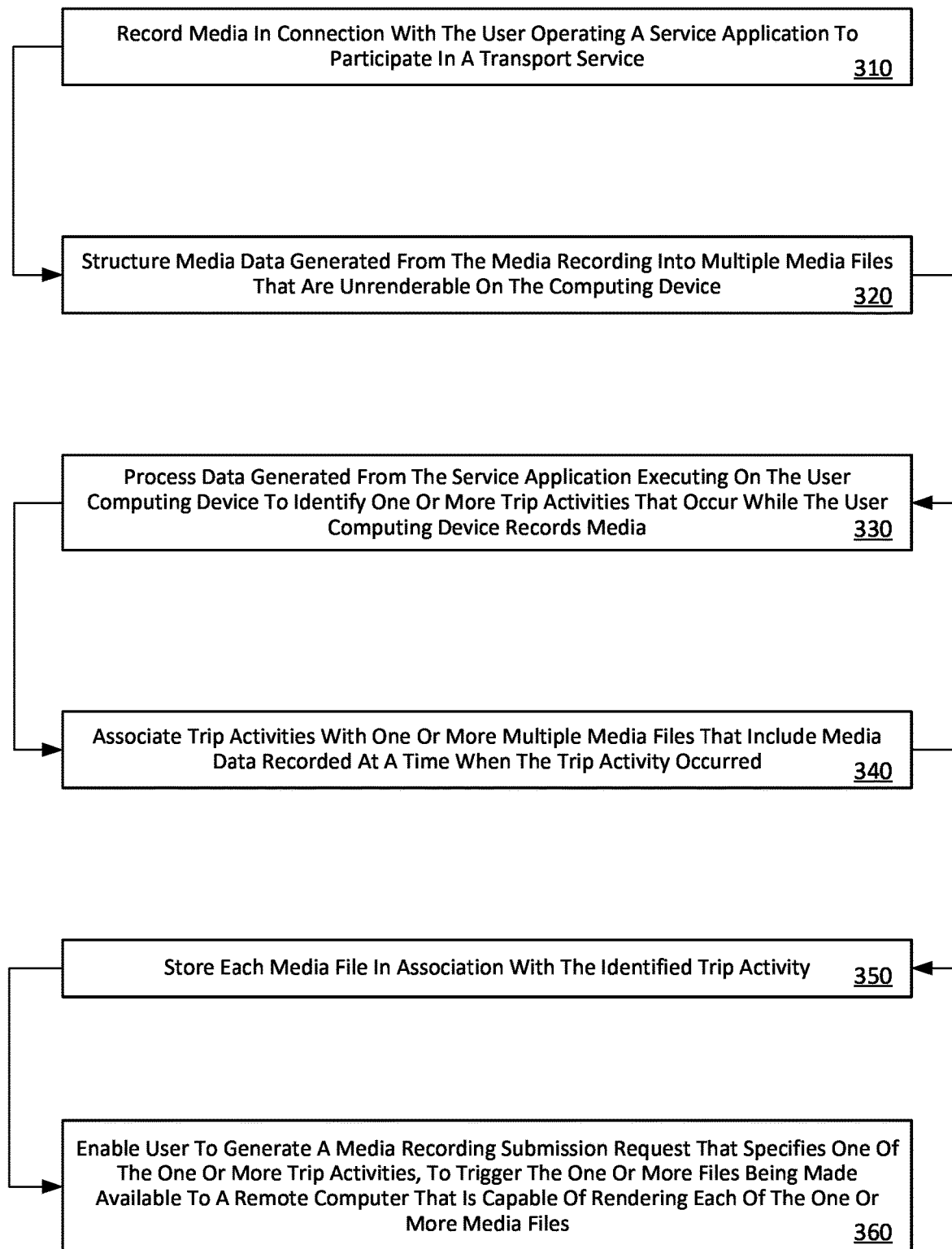
FIG. 3 illustrates a method for operating a computing device to implement a media recording process.
Figure 4:
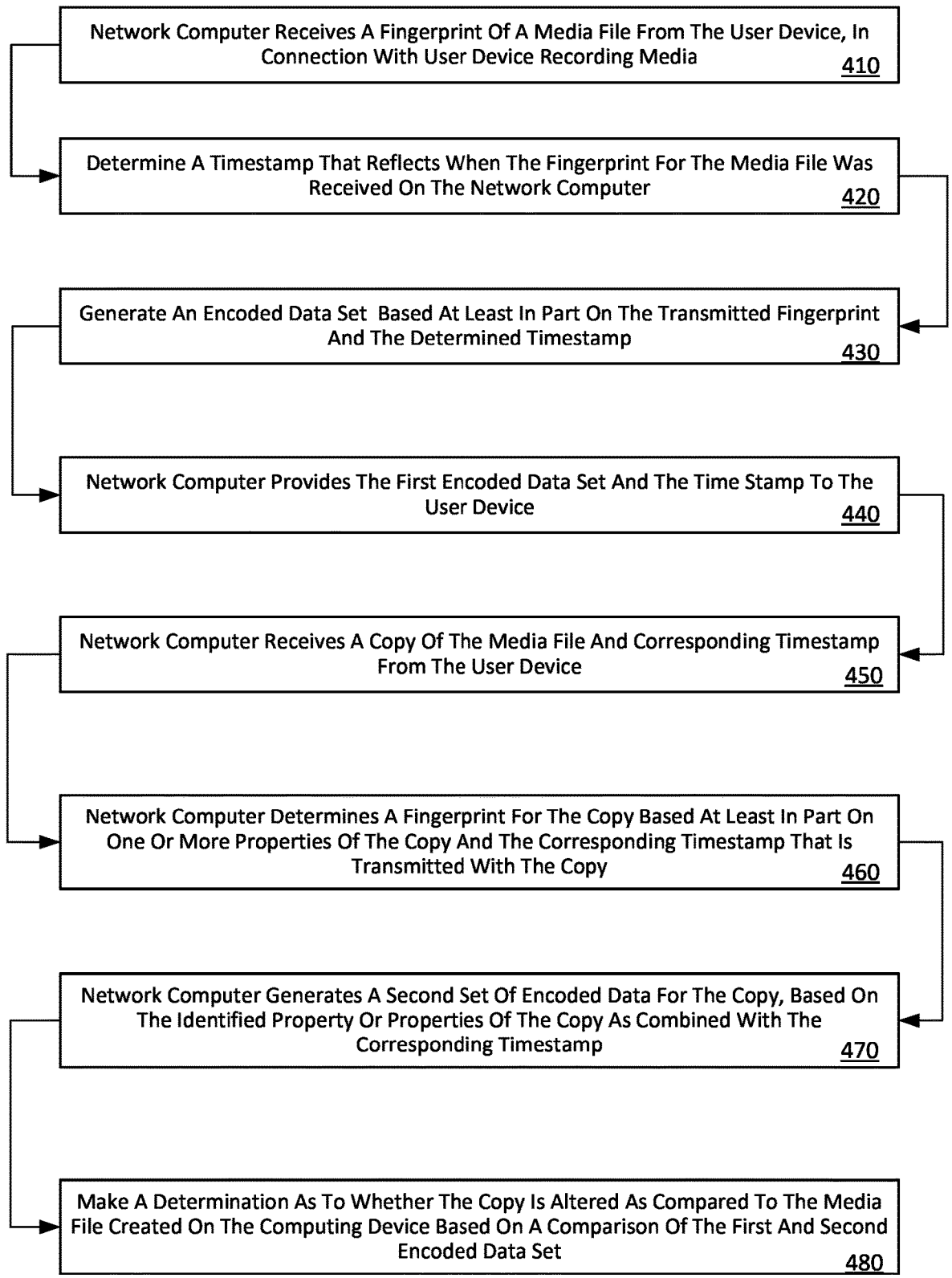
FIG. 4 illustrates a method for verifying a copy of a media file with an original media file recording.

FIG. 3 illustrates a method for operating a computing device to implement a media recording process. FIG. 4 illustrates a method for verifying a copy of a media file with an original media file recording. In describing examples of FIG. 3 and FIG. 4, reference may be made to elements of FIG. 1 or FIG. 2 for purpose of illustrating suitable elements for performing a step or sub-step being described.

With reference to FIG. 3, a computing device of a user can operate to record media in connection with the user operating a service application to participate in a transport service (310). For example, either a requester or service provider can operate the service application 216 to initiate an audio recording on the user's computing device, in connection with the user participating in the transport service (e.g., user is service provider who provides trip or user is requester who receives trip).

The user device 210 can further operate to structure media data generated from the media recording into multiple media files that are unrenderable on the computing device (320). For example, the service application 216 may implement operations to segment recorded media data into a sequenced set of media files, where each media file is encrypted. In an implemented, each recorded media file may be encrypted using a private key (e.g., generated in part using data obtained from the network computer 250), and each media file may be stored in associated with an encrypted version of the private key (e.g., encrypted using a public key obtained from the network computer 250). As an addition or variation, the media files reflecting segments of the media recordings may be stored in an application memory that is under control of the service application 216, so as to be hidden and not accessible to the user.

In some examples, as media files are created for corresponding segments of a media recording, the service application 216 initiates a separate process (e.g., background process) in which a fingerprint is determined for each newly created media file, where the fingerprint reflects an original state of the media file. By way of example, the fingerprint of each media file may be based on a set of metadata for the media file. As described with an example of FIG. 4, the service application 216 can transmit the fingerprint of each media file to the network computer 250, and then receive a set of encrypted data from the network computer 250, along with a network-side timestamp (reflecting when the media file was received on the network) and a key identifier (e.g., key version).

The user device 210 may process data generated from the service application executing on the user computing device to identify one or more trip activities that occur while the user computing device records media (330). In examples, the identified trip actives can include events detected by the service application 216. As an addition or variation, the identified trip activities can be reflected through an application state of the service application 216.

In examples, each of the one or more trip activities are associated with one or more of the multiple media files that include media data recorded at a time when the trip activity occurred (340). For example, the trip activities can delineate the start and/or end of a user trip, and an identifier of the trip may be associated with each of the media files.

In examples, each of the multiple media files are stored in association with the identified trip activity on the user device 210 (350). In this way, the association of individual media files with individual trips may thus enable the user of the computing device to select a trip in order to identify each media file associated with the trip.

According to examples, the user device 210 can enable the user to generate a media recording submission request that specifies one of the one or more trip activities, to trigger the one or more files being made available to a remote computer that is capable of rendering each of the one or more media files (360), using cryptographic data provided by the user device 210. By way of example, the user device 210 may also transmit an encrypted private key which can be decrypted using a public key that is available to the network computer 250.

In examples, the user can view a trip log to select a particular trip, causing the user device 210 to initiate a background process in which each media file (or copy thereof) associated with the identified trip is identified and transmitted to the network computer 250. When the media recording for a given trip is segmented into multiple files, each media file is automatically identified and transmitted to the network computer 250.

With reference to FIG. 4, the recording manager 260 may operate on the network computer 250 to receive a fingerprint of a media file created on a computing device of a user (410). As described with other examples, the fingerprint may be received in connection with the user device 210 implementing media recording process 215. For example, the service application 216 can record media on the user device 210 as the user provides or receives transport, and media data generated from the media recording is segmented and encrypted into corresponding media files that are stored on the user device 210. The stored media file may reflect an original media file, structured (e.g., encrypted) to be unrenderable on the user device 210. According to examples, as each media file is being created, the service application 216 can (i) determine a fingerprint for the media file, and (ii) transmit the fingerprint to the recording manager 260. In such examples, the fingerprint can be based on a set of metadata that reflects an original state of the corresponding media file (e.g., creation time, size of media file, etc.).

In turn, the recording manager 260 can determine a timestamp that reflects when the fingerprint for the media file was received by the network computer 250 (420). In some examples, the timestamp is created to be within a designated duration of a creation time of the corresponding media file on the user device 210.

The recording manager 260 generates an encoded data set based at least in part on the transmitted fingerprint and the determined timestamp (430). In some examples, the recording manager 260 concatenates the fingerprint and the determined timestamp (network side), then encrypts the data set (e.g., using a public key) and obtains a resulting signature.

The recording manager 260 provides the first encoded data set and the time stamp to the user device 210 (440). On the user device 210, the provided data set (e.g., encrypted concatenated fingerprint and timestamp) and timestamp or stored on the computing device in association with the corresponding media file. As described with some examples, no further action may be taken on the media file, unless a user of the computing device makes a submission of the media recording.

In such event, the network computer 250 receives a copy of the media file and the corresponding timestamp from the user device 210 (450), where the corresponding timestamp is the same as the timestamp determined for the original media file and provided to the user device 210 in (440). In examples, the transmission of the copy of the media file includes the first set of encoded data. Additionally, the transmission of the copy may include an encrypted key or other cryptographic data which the network computer 250 can use the decrypt the copy.

In examples, the recording manager 260 implements operations to verify that the copy of the submission is a true copy of the original media file. The recording manager 260 may verify that the submission copy reflects the original media file in its original state. To implement verification operations, the recording manager 260 determines a fingerprint for the copy based at least in part on one or more properties of the copy and the corresponding timestamp that is transmitted with the copy (460). The properties used to determine the fingerprint of the copy may be the same as those used to determine the fingerprint of the original media file. Thus, for example, the recording manager 260 may inspect the copy to identify the file size, creation/modification date or other metadata from which the fingerprint for the copy is determined.

The recording manager 260 generates a second set of encoded data for the copy, based on the identified property or properties of the copy as combined with the corresponding timestamp (470). In some examples, the first set of encoded data may be generated using a key having an identifier (e.g., key version). When the copy is received, the recording manager 260 uses the key identifier (e.g., key version) to retrieve the same key, and then applies the retrieved key to, for example, a concatenation of the determined fingerprint and the received timestamp of the copy.

According to example, the recording manager 260 can make a determination as to whether the copy is altered as compared to the media file created on the computing device based on a comparison of the first and second encoded data set (480). As described with (470), the second set of encoded data can be determined by the recording manager 260 using data provided in the transmission of the copy. The first set of encoded data may also be communicated with the transmission of the copy. As an addition or variation, the first set of encoded data may be stored with the network computer 250 for use in the event a submission of a media recording is made by a user.

As described with various examples, the recording manager 260 may make the recording manager 260 renderable based in part on the determination—for example, the recording manager 260 may make the copy renderable on the recording manager 260 if the copy is verified, else the copy is not made available. Alternatively, the verification determination can be made available to the party seeking to render the copy of the media recording.

Among other technical benefits and advantages, examples as described enable the network computer 250 to control the access and use of the original media file. As the original file may contain sensitive or confidential information relating to a third-party, the media file can be inaccessible and non-renderable while on the user device 210. On the other hand, the user device 210 can transmit copies of the media files to the network computer 250, where the copies may be made renderable under predetermined conditions (e.g., for law enforcement, when permission of the other party is provided). In examples, the network computer 250 may make the transmitted media files renderable by using a stored public key to decrypt the private key which is transmitted with the copy. The decrypted private key may then be used to decrypt the media file.

In some variations, the network computer 250 can cause the user device 210 to programmatically delete the media files of a recording after passage of time (e.g., 7 days), or in response to certain events (e.g., once a copy of the media file is transmitted to the network computer 250). The network computer 250 can instruct or otherwise configure the service application 216 such that deletion occurs without intervention from the user. Such examples provide an added measure of security against the possibility of the user of the computing device accessing and rendering such media files.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A computing device comprising:
one or more processors;
a memory to store a set of instructions;
wherein the one or more processors access the set of instructions to perform operations that include:
(a) recording media on the computing device during a time interval in which a user participates in a transport service;
(b) structuring media data generated from recording the media into multiple media files that are unrenderable on the computing device;
(c) processing data generated from a service application executing on the computing device to identify one or more trip activities that occur while the computing device is recording the media;
(d) associating each of the one or more trip activities with one or more of the multiple media files that include the media data recorded at a time when the trip activity occurred;

(e) storing each of the multiple media files in association with the identified trip activity; and (f) enabling the one or more multiple media files to be made available to a remote computer that is capable of rendering each of the one or more of the multiple media files;

wherein recording the media on the computing device includes recording the media for a predetermined time interval that extends beyond completion of the transport service, and enabling the user to selectively extend the recording beyond the predetermined time interval.

2. The computing device of claim 1, wherein the time interval is based at least in part on a timer.

3. The computing device of claim 1, wherein the operations include:

automatically detecting that the transport service has completed.

4. The computing device of claim 1, wherein recording media on the computing device is automatically initiated in response to a detected event.

5. The computing device of claim 1, wherein recording media on the computing device is initiated in response to a designated input from the user.

6. The computing device of claim 5, wherein the designated input is received from the user through the service application.

7. The computing device of claim 1, wherein recording media on the computing device is automatically initiated by the service application in response to a detected application state of the service application.

8. The computing device of claim 1, wherein the operations further comprise:

precluding the computing device from recording media unless the service application is detected to have a particular application state.

9. The computing device of claim 1, wherein the operations further comprise:

precluding the computing device from recording media unless a particular event is detected through the service application.

10. The computing device of claim 1, wherein structuring media data generated from recording the media into multiple media files and storing each of the multiple media files in association with the identified trip activity are performed as media is generated by recording the media on the computing device.

11. A method for operating a computing device, the method being implemented by one or more processors and comprising:

(a) recording media on the computing device during a time interval in which a user participates in a transport service;

(b) structuring media data generated from recording the media into multiple media files that are unrenderable on the computing device;

(c) processing data generated from a service application executing on the computing device to identify one or more trip activities that occur while the computing device is recording the media;

(d) associating each of the one or more trip activities with one or more of the multiple media files that include the media data recorded at a time when the trip activity occurred;

(e) storing each of the multiple media files in association with the identified trip activity; and (f) enabling the one or more multiple media files to be made available to a remote computer that is capable of rendering each of the one or more of the multiple media files;

wherein recording the media on the computing device includes recording the media for a predetermined time interval that extends beyond completion of the transport service, and enabling the user to selectively extend the recording beyond the predetermined time interval.

12. The method of claim 11, wherein the time interval is based at least in part on a timer.

13. The method of claim 11, further comprising:

automatically detecting that the transport service has completed.

14. The method of claim 11, wherein recording media on the computing device is automatically initiated in response to a detected event.

15. The method of claim 11, wherein recording media on the computing device is initiated in response to a designated input from the user.

16. The method of claim 15, wherein the designated input is received from the user through the service application.

17. The method of claim 11, wherein recording media on the computing device is automatically initiated by the service application in response to a detected application state of the service application.

18. The method of claim 11, further comprising:

precluding the computing device from recording media unless (i) the service application is detected to have a particular application state, or (ii) a particular event is detected through the service application.

19. The method of claim 11, wherein structuring media data generated from recording the media into multiple media files and storing each of the multiple media files in association with the identified trip activity are performed as media is generated by recording the media on the computing device.

20. A non-transitory computer-readable medium that stores instructions, which when executed by one or more processors of a computing system, cause the computing system to perform operations that include:

(a) recording media on a computing device during a time interval in which a user participates in a transport service;

(b) structuring media data generated from recording the media into multiple media files that are unrenderable on the computing device;

(c) processing data generated from a service application executing on the computing device to identify one or more trip activities that occur while the computing device is recording the media;

(d) associating each of the one or more trip activities with one or more of the multiple media files that include the media data recorded at a time when the trip activity occurred;

(e) storing each of the multiple media files in association with the identified trip activity; and (f) enabling the one or more multiple media files to be made available to a remote computer that is capable of rendering each of the one or more of the multiple media files;

wherein recording the media on the computing device includes recording the media for a predetermined time interval that extends beyond completion of the transport service, and enabling the user to selectively extend the recording beyond the predetermined time interval.

* * * * *